Patented Aug. 21, 1945

2,383,425

UNITED STATES PATENT OFFICE 2,383,425

POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application May 21, 1942, Serial No. 443,983

16 Claims. (Cl. 260—84.5)

This invention relates to the polymerization of unsaturated organic compounds which are capable of undergoing addition polymerization to form high molecular weight linear polymers and particularly to the polymerization in aqueous emulsion of open-chain aliphatic conjugated dienes such as butadiene-1,3 either alone or in admixture with other copolymerizable materials. The principal object of the invention is to provide a new class of materials which initiate and catalyze such polymerizations.

I have discovered that the time required to effect addition polymerization reactions may be decreased considerably by carrying out the polymerization in the presence of a small or catalytic amount of a compound of the class which may be defined generally as complex compounds containing a central heavy metal atom and at least one nitrogen-containing coordinating group connected to said heavy metal atom by a coordinating or secondary valence.

The terminology used in defining the compounds of this class follows the well-known and commonly accepted usage originally set forth in Werner's Coordination Theory and may best be explained with reference to the structure of one well-known compound in this class, potassium ferricyanide, $K_3Fe(CN)_6$, for example. Thus, according to the Werner theory, a "complex compound" is one which contains as a component, a compound which is capable of separate existence. Since potassium ferricyanide may be said to contain KCN which is a compound capable of separate existence, potassium ferricyanide is a "complex compound." Ferric chloride on the other hand is a "simple" compound rather than a "complex" compound since it may not be said to contain a component which is a compound capable of separate existence. Furthermore, according to the Werner theory, complex compounds contain an element which is known as the "central atom" or the "nuclear atom," which is capable of exerting two distinct types of valences, namely, a primary or electrovalence, that is, the ability to transfer electrons to or from other atoms, or groups, and a coordinating or "secondary" or "auxiliary" valence, that is the ability to share one electron of an electron pair with other atoms or groups. The groups or atoms which share one electron of an electron pair with the central atom are known as coordinating groups and may or may not themselves exert primary electrovalences. The central atom together with the coordinating groups make up the "complex" which, depending upon the sum of the electrovalences exerted by the central atom and the coordinating group, may be neutral or it may be positively or negatively charged and thus capable of combining with other charged atoms or radicals to form salts. The number of coordinating groups attached to the central atom is called the coordination number. In the case of potassium ferricyanide which may be represented as

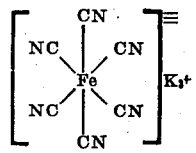

it is seen that the complex is contained within the brackets and consists of Fe as the central atom and six CN groups as the coordinating groups. The coordination number of iron in this compound is thus seen to be six. Since ferric iron exerts an electrovalence of $+3$ and since the six CN groups each exert an electrovalence of $-1$, the complex as a whole is an anion carrying a charge of $-3$ and is combined with three potassium cations to form the salt.

The complex compounds which are employed in the polymerization of organic compounds in this invention contain a heavy metal as the central atom. The term heavy metal is used in its proper scientific sense to signify metals which have a density greater than four, an atomic weight greater than forty and a low atomic volume (ratio of atomic weight to density) and consequently appear substantially at the minimum points above an atomic weight of forty on Lother Meyer's atomic volume curve. The metals appearing in the center positions of the long periods of a periodic table arranged in short and long periods, and especially those which occur in the 6th to 12th positions of the long periods (considering the alkali metals to occupy the first position and all the rare earth metals to occupy a single position, that is, the metals appearing in group VIII, subgroup B of groups I and II and subgroup A of groups VI and VII, such as iron, cobalt, nickel, chromium, manganese, copper, zinc and mercury are accordingly among the metals included in the term heavy metal. The metals occurring in the 6th to 12th positions of the first long period of the periodic table, particularly in group VIII of the first long period, that is, iron, cobalt and nickel, readily form complexes and are therefore preferred. Such metals usually possess a coordination number of four to eight, most often six.

In the class of complex compounds of this invention, the heavy metal atom is coordinated with at least one nitrogen-containing coordinating group. Examples of such groups are the CN⁻ or cyanide group, which carries an electrovalent charge of −1, the CNS⁻ or thiocyanate group, which also carries an electrovalent charge of −1, and the nitrogen containing neutral bodies which do not carry an electrovalent charge such as the NO or nitroso group, the $NO_2$ or nitrito group, the $NH_3$ or ammine group, and organic nitrogen-containing groups such as the pyridine and ethylene diamine groups. The preferred complex compounds have all of the coordinated valences of the central heavy metal atom attached to nitrogen-containing groups but compounds wherein one or more but not all of the nitrogen-containing groups are replaced by other coordinating groups which are negatively charged ions such as $Cl^-$, $Br^-$, $I^-$, $F^-$, $OH^-$, $SO_3^=$, $SO_4^=$, $CO_3^=$ and $C_2O_4^=$, or are neutral bodies such as $H_2O$, $SO_2$, $CO$, and $S$, are also included in this class of complex compounds.

Specific examples of complex compounds containing a central heavy metal atom and at least one nitrogen containing coordinating group connected to the heavy metal atom by a coordinating valence include the following:

Sodium cobaltinitrite
$$Na_3[Co(NO_2)_6]$$

Sodium ferrinitrite
$$Na_3[Fe(No_2)_6]$$

Sodium nitroprusside
$$Na_2[Fe(CN)_5NO]$$

Potassium ferricyanide
$$K_3[Fe(CN)_6]$$

Potassium ferrocyanide
$$K_4[Fe(CN)_6]$$

Potassium cobalticyanide
$$K_3[Co(CN)_6]$$

Sodium ferrothiocyanate
$$Na_4[Fe(SCN)_6]$$

Potassium nickelocyanide
$$K_2[Ni(CN)_4]$$

Potassium chromicyanide
$$K_3[Cr(CN)_6]$$

Potassium cupricyanide
$$K_3[Cu(CN)_4]$$

Sodium ammine-ferricyanide
$$Na_3[Fe(CN)_5NH_3]$$

Sodium aquo-ferricyanide
$$Na_3[Fe(CN)_5H_2O]$$

Sodium tetranitrito diammine cobalt
$$Na[Co(NO_2)_4(NH_3)_2]$$

Trinitrito triammine cobalt
$$[(NO_2)_3Co(NH_3)_3]$$

Leuteocobaltic chloride (hexammine cobaltic chloride)
$$[Co(NH_3)_6]Cl_3$$

Diaquo tetrammine cobaltic nitrate
$$[Co(NH_3)_4(H_2O)_2](NO_3)_3$$

Nitrato pentammine cobaltic chloride
$$[Co(NO_3)(NH_3)_5]Cl_2$$

Chloro-diaquo-triammine cobaltic bromide
$$[Co(NH_3)_3Cl(H_2O)_2]Br_2$$

Dinitrito-tetrammine cobaltic nitrate
$$[Co(NH_3)_4(NO_2)_2]NO_3$$

Carbonato tetrammine cobaltic nitrate
$$[Co(CO_3)(NH_3)_4]NO_3$$

Zinc ammonium chloride
$$[Zn(NH_3)_4]Cl_2$$

Cupric ammonium sulfate
$$[Cu(NH_3)_4]SO_4$$

Triethylene diammine cobaltic chloride
$$[Co(en)_3]Cl_3$$

Tripropylene diammine chromic chloride
$$[Cr(pn)_3]Cl_3$$

From these above specific examples it is seen that the most common types of complex compounds occurring in the above defined class are the complex cyanides wherein the coordinated groups are CN⁻ radicals, the complex nitroso or nitrito compounds wherein the coordinated groups are NO or $NO_2$ groups and the complex ammines wherein the coordinated groups are $NH_3$ groups. The preferred compounds for use in the polymerization of unsaturated organic compounds, particularly when the polymerization is effected in aqueous emulsion, are the water-soluble complex salts of the type illustrated in the specific examples, that is, salts wherein the complex carries an electrovalent charge and is combined with anions or cations in the form of water-soluble salts. When the complex is an anion, the salts formed from such an anion and a cation which is an alkali metal ion are water soluble and are especially preferred. On the other hand, when the complex is a cation, the salts formed from such a cation and an anion which is a nitrate, chloride, bromide, sulfate or carbonate ion or the like are water soluble and are also preferred. Since many of the compounds in this class are rather uncommon and are somewhat difficult to prepare, it is, of course, preferred to utilize a commonly available compound such as the alkali metal ferricyanides, ferrocyanides, cobalticyanides, nitroprussides and cobaltinitrites. The complexes containing a central heavy metal atom which is present in its oxidized state such as the ferri and cobalti complexes are particularly preferred. Sodium cobaltinitrite is an especially valuable material for use in the emulsion polymerization of open-chain aliphatic conjugated dienes. The choice of the particular complex compound to be used in the polymerization will also depend upon the particular compounds being polymerized, the particular method of polymerization and the nature of the other substances present during the polymerization as will be more apparent from the following description of the several variables involved and from the specific examples given.

In the practice of this invention addition polymerizations of unsaturated organic compounds to form high molecular weight linear polymers are preferably carried out in aqueous emulsion in the presence of a catalytic amount of one of the above-described complex compounds, although other methods of polymerization well known to the art such as polymerization in homogenous systems by the application of heat, actinic light or pressure to the monomers either alone or in presence of diluent or solvent, may also be employed. In the emulsion polymerization process, the unsaturated compounds, or monomers, to be polymerized are emulsified in water with the aid of an emulsifying agent and polymerization is then effected by adding the complex compound together, if desired, with various other substances, the nature of which will be described hereinafter, and then agitating the emulsion at a temperature of about 0° to 80° C. until polymer is formed. The resulting polymerized emulsion containing polymer particles dispersed in water greatly resembles natural rubber latex and may be coagulated in the usual manner to yield the solid polymer.

The amount of the complex compound to be used in the polymerization may be varied somewhat depending upon the particular catalyst used and the particular compounds present in the system being polymerized but, in general, it may be said that only catalytic amounts, that is, amounts less than 1% and preferably less than about 0.2% based on the weight of the monomers should be used. When the complex compound is the sole polymerization catalyst or initiator present in the system being polymerized, it is preferable to employ from .05 to .2% of the complex compound based on the monomers, while in instances where the complex compound is used in connection with an initiator of polymerization or some other catalyst amounts of from 0.01 to 0.05% by weight or even smaller usually give best results.

As has been mentioned hereinabove the complex heavy metal compounds of this invention may be used generally in the polymerization of those unsaturated organic compounds which undergo addition polymerizations to form high molecular weight linear polymers by which is meant that a large number of monomer molecules add onto one another to form a large molecule having a predominantly linear structure. Unsaturated organic compounds which undergo such polymerizations generally contain the characteristic structure

and, in most cases, have at least two hydrogen atoms attached to carbon usually to the same carbon atom, and have at least one of the disconnected valences not attached to hydrogen attached to an electronegative group, that is, a group which increases the polar character of the molecule such as a halogen atom or an organic group containing an unsaturated linkage such as vinyl, phenyl, nitrile, carboxy or the like. Included in this class of monomers are the open-chain aliphatic conjugated dienes such as butadiene-1,3, 2,3-dimethyl butadiene-1,3, isoprene, chloroprene, piperylene, 3-furyl butadiene-1,3, 3-methoxy butadiene-1,3 and the like; aryl olefins such as styrene, p-chloro styrene, p-methoxy styrene, alpha-methyl styrene, vinyl naphthalene and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, isobutylene, vinyl acetylene and other unsaturated hydrocarbons, esters, alcohols, acids, ethers, etc., of the type described. Such unsaturated compounds may be polymerized alone, in which case simple linear polymers are formed, or mixtures of two or more of such compounds which are copolymerizable with each other may be polymerized to form linear copolymers.

The catalysts of this invention are particularly effective when the polymerization is effected in aqueous emulsion and when the monomeric material polymerized is a butadiene-1,3 hydrocarbon, by which is meant butadiene-1,3 itself and its hydrocarbon homologs, or a mixture of a butadiene-1,3 hydrocarbon with a lesser amount of at least one other compound which contains a single olefinic double bond and is copolymerizable therewith such as aryl olefins, acrylic and substituted acrylic acids, esters, nitriles and amides, methyl isopropenyl ketone, vinylidene chloride, diethyl fumarate and similar compounds of the type mentioned hereinabove. In this case, as in other instances where the monomers polymerized consist predominantly of open-chain aliphatic conjugated dienes, the products of the polymerization are high molecular weight linear polymers and copolymers which are rubbery in character and may be called synthetic rubber. The polymerization of other monomers and monomer mixtures of the type described to form linear polymers of a resinous character is also improved, however, by the catalysts of this invention.

As emulsifying agents which may be employed in emulsion polymerizations may be mentioned soaps such as sodium oleate, potassium palmitate and sodium myristate, synthetic saponaceous materials including hymolal sulfates and alkaryl sulfonates such as sodium lauryl sulfate and sodium isopropyl naphthalene sulfonate, and salts of organic bases containing long carbon chains such as trimethyl-cetyl-ammonium methyl sulfate, the hydrochloride of oleylamidoethyl dimethylamine, the hydrochloride of diethylaminoethyl-oleylamide and the like. The soaps are employed in polymerizations under basic conditions, the salts of organic bases under acid conditions and the synthetic saponaceous materials under acid, alkaline or neutral conditions. Obviously the emulsifying agent should be selected in any given instance with relation to the conditions under which the complex compound is stable and is most active as a catalyst. Most of the complex compounds described, particularly those which are water soluble salts, are stable either in alkaline or acid media, but in general the emulsion should neither be too acid or too alkaline for most efficient catalysis by the complex compound. With the cobaltinitrites alkaline conditions are preferred while neutral or slightly acid conditions are preferred for the ferricyanides.

Polymerization initiators which may or may not be employed in the polymerization batch together with the complex compounds of this invention include per-compounds such as hydrogen peroxide, benzoyl peroxide, potassium persulfate, sodium perborate, potassium percarbonate and the like as well as other types of initiators such as diazoaminobenzene, sulfur dioxide, dipotassium diazomethane disulfonate and triphenylmethylazobenzene. The per-compounds, particularly hydrogen peroxide, when used with a soap as the emulsifying agent, give especially good results in the emulsion polymerization of conjugated butadiene hydrocarbons in the presence of many of the complex compounds described, but it is to be understood that the presence of one of these polymerization initiators is by no means essential and with some complex compounds, sodium cobaltinitrite, for example, the polymerization is equally as rapid and produces equally as good a polymer when no additional initiator is employed. It may thus be said that the complex compounds in this class are themselves initiators.

It is also desirable in the emulsion polymerization of open-chain aliphatic conjugated dienes to form synthetic rubber, to employ a polymerization modifier which increases the plasticity and solubility of the rubbery polymers produced. Compounds suitable for this purpose include sulfur-containing compounds such as dialkyl dixanthogens, the higher tetraalkyl thiuram mono and polysulfides, mercaptoalkyl thiazoles and the like.

The preferred manners of practicing this invention and the improved results obtained thereby may be shown by the following specific examples which are intended to illustrate rather than limit the invention.

Example I

A mixture of 55 grams of butadiene and 45 grams of acrylonitrile is emulsified in 250 cc. of a 2% aqueous solution of myristic acid which is 85% converted into soap by neutralization with sodium hydroxide. 10 cc. of a 3½% solution of hydrogen peroxide, 0.3 gram of a polymerization modifier, di-isopropyl dixanthogen, and a 0.01 gram of sodium cobaltinitrite are added to the emulsion and the emulsion is agitated at 30° C. until polymer is formed. The polymerization is complete in 16½ hours and yields 98 grams of a rubbery copolymer of butadiene and acrylonitrile. A similar polymerization in which no sodium cobaltinitrite is employed requires 45 hours for completion and is only about 25% polymerized after 16½ hours. The solubility and plasticity of the rubbery copolymer prepared in the presence of sodium cobaltinitrite is equal to that of the polymer prepared in the absence of the complex compound and the vulcanizates obtained from the polymers prepared in the presence of sodium cobaltinitrite possess higher tensile strength and ultimate elongation than similar vulcanizates from the polymers prepared in the absence of the complex compound. It was also observed that the hot milling properties of the copolymer prepared in the presence of sodium cobaltinitrite were greatly improved over those of the copolymer prepared in the absence of the complex.

Example II

Example I is repeated except that .01 gram of sodium nitroprusside is employed in place of sodium cobaltinitrite. In this instance the polymerization required only 14 hours to produce a 98% yield of a rubbery butadiene acrylonitrile copolymer having properties comparable to the copolymer obtained in Example I.

Example III

An emulsion containing the following ingredients is prepared:

| | Parts |
|---|---|
| Butadiene | 70 |
| Styrene | 30 |
| Sodium myristate (2% aqueous solution) | 250 |
| Hydrogen peroxide | 0.35 |
| Di-isopropyl dixanthogen | 0.45 |
| Sodium ferrinitrite | 0.02 |

The emulsion is then agitated at 30° C. for 65 hours whereupon a synthetic latex is obtained which, when coagulated, produces a 99% yield of a rubbery copolymer. The copolymer is plastic and easily milled and may be compounded and vulcanized to form strong elastic vulcanizates. When a similar emulsion is polymerized without the addition of the complex compound the polymerization requires over 150 hours.

The above examples illustrate the practice of the invention where a per-oxygen compound (hydrogen peroxide) is employed as the initiator of polymerization together with the complex heavy metal compound. However in many instances it is undesirable to employ such a per-oxygen compound because of the danger of oxidizing the polymeric product after the polymerization is complete and thus reducing the quality of the product. By this invention it has been found that polymerization occurs in a convenient length of time when complex compounds of the character described are employed in the polymerization even though no per-oxygen compound is used in the polymerization recipe. This is shown more fully by the following examples.

Example IV

A mixture of 55 parts by weight of butadiene and 45 parts by weight of acrylonitrile is agitated at 30° C. in an aqueous emulsion containing about 250 parts of a 3% aqueous solution of myristic acid which had been 85% neutralized with sodium hydroxide, 0.6 part of 2-mercapto-4-ethyl thiazole and 0.5 part of sodium cobaltinitrite. A 95% yield of a rubbery butadiene acrylonitrile copolymer in the form of a synthetic rubber latex is obtained in only 16 hours, although in the absence of sodium cobaltinitrite no polymerization occurs in over 150 hours.

Example V

An aqueous emulsion similar to the emulsion described in Example IV except that an aqueous solution of sodium lauryl sulfate is employed as the emulsifying agent in place of the sodium myristate solution and that 0.2 part of potassium ferricyanide are used in place of the sodium cobaltinitrite is polymerized at 40° C. A good yield of a synthetic rubber is obtained in 99 hours whereas in the absence of potassium ferricyanide the emulsion does not begin to polymerize even after more than 150 hours.

Example VI

An aqueous emulsion containing 55 parts by weight of butadiene, 45 parts by weight of acrylonitrile, 250 parts of an aqueous soap solution, 0.6 part of diisopropyl dixanthogen as a polymerization modifier and 0.5 part of triammine-tri-nitrito cobalt,

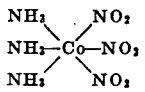

is polymerized at 30° C. After 141 hours a 93% yield of a rubbery butadiene acrylonitrile copolymer having good properties is obtained. In the absence of the complex compound no polymerization occurs in 150 hours.

Example VII

Example VI is repeated using carbonato-tetrammine cobaltic nitrate, [Co(NH₃)₄CO₃]NO₃, as the complex compound. A 94% yield of a similar rubbery copolymer is obtained in 141 hours.

Example VIII

An aqueous emulsion containing 75 parts by weight of butadiene and 25 parts by weight of styrene as the polymerizable materials, 250 parts of a 3% aqueous solution of sodium myristate as the emulsifying agent, 0.045 part of diisopropyl dixanthogen as the polymerization modifier and 0.5 part of potassium cobaltic cyanide, as the polymerization initiator and polymerization catalyst, is agitated at 30° C. A good yield of copolymer is obtained in 184 hours, although this system does not polymerize when the complex compound is eliminated.

When the examples given hereinabove are repeated using methyl acrylate, methyl methacrylate, methyl isopropenyl ketone, vinylidene chloride and other monomers in place of the styrene or acrylonitrile, other synthetic rubbers are obtained in about the same length of time. The proportions of the monomers in the mixture may also be varied without appreciably affecting the rate of the polymerization. For example a monomer mixture containing 90 parts of styrene and 10 parts of butadiene may be polymerized as in Example III in about 100 hours to produce a latex-like mass which may be coagulated to produce a strong, flexible, thermoplastic synthetic resin. Other thermoplastic resins may be obtained by using styrene, methyl methacrylate, vinyl chloride or the like alone or in admixture with each other as the polymerizable material.

Other methods and procedures known to be useful in connection with the polymerization of unsaturated organic compounds are within the spirit and scope of the invention as defined in the appended claims.

I claim:

1. The method which comprises polymerizing in aqueous emulsion a butadiene-1,3 hydrocarbon in the presence of from 0.01 to 1% by weight based on the material polymerized of a water-soluble complex compound containing a central heavy metal atom connected by a coordinating valence to a nitrogen-containing coordinating group which is a neutral body possessing no electrovalent charge.

2. The method which comprises polymerizing in aqueous emulsion a mixture of a butadiene-1,3 hydrocarbon and another unsaturated compound which contains a single olefinic double bond and is copolymerizable therewith in aqueous emulsion, in the presence of from 0.01 to 1% by weight based on the material polymerized of a water-soluble complex compound containing a central heavy metal atom, derived from a heavy metal element occurring in group VIII and the first long period of the periodic table, said central heavy metal atom having a primary positive valence of three and a coordination number of six and being connected by at least one of the six coordinating valences to a nitrogen-containing coordinating group which is a neutral body possessing no electrovalent charge.

3. The method which comprises polymerizing in aqueous emulsion a butadiene-1,3 hydrocarbon in the presence of from 0.01 to 1% by weight based on the material polymerized of a water-soluble complex compound containing a central heavy metal atom connected by a coordinating valence to a coordinating group composed of one atom of nitrogen and from one to two atoms of oxygen.

4. The method which comprises polymerizing in aqueous emulsion a butadiene-1,3 hydrocarbon in the presence of from 0.01 to 1% by weight based on the material polymerized of a water-soluble complex compound containing a central heavy metal atom, derived from a heavy metal element occurring in group VIII and the first long period of the periodic table, said central heavy metal atom having a primary positive valence of three and a coordination number of six and being connected by at least one of the six coordinating valences to a coordinating group composed of one atom of nitrogen and from one to two atoms of oxygen.

5. The method which comprises polymerizing in aqueous emulsion a mixture of a butadiene-1,3 hydrocarbon and another unsaturated compound which contains a single olefinic double bond and is copolymerizable therewith in aqueous emulsion, in the presence of a per-oxygen compound and from 0.01 to 1% by weight based on the material polymerized of a water-soluble complex compound containing a central heavy metal atom, derived from a heavy metal element occurring in group VIII and the first long period of the periodic table, said central heavy metal atom having a primary positive valence of three and a coordination number of six and being connected by all six of its coordinating valences to nitrogen-containing coordinating groups at least one of which is a coordinating group composed of one atom of nitrogen and from one to two atoms of oxygen.

6. The method which comprises polymerizing in aqueous emulsion a mixture of butadiene-1,3 and styrene in the presence of from 0.01 to 1% by weight based on the material polymerized, of a water-soluble complex compound containing a central heavy metal atom, derived from a heavy metal element occurring in group VIII and the first long period of the periodic table, said central heavy metal atom having a primary positive valence of three and a coordination number of six and being connected by all six of its coordinating valences to nitrogen-containing coordinating groups at least one of which is a coordinating group composed of one atom of nitrogen and from one to two atoms of oxygen.

7. The method which comprises polymerizing in aqueous emulsion a mixture of butadiene-1,3 and acrylonitrile in the presence of from 0.01 to 1% by weight based on the material polymerized, of a water-soluble complex compound containing a central heavy metal atom, derived from a heavy metal element occurring in group VIII and the first long period of the periodic table, said central heavy metal atom having a primary positive valence of three and a coordination number of six and being connected by all six of its coordinating valences to nitrogen-containing coordinating groups at least one of which is a coordinating group composed of one atom of nitrogen and from one to two atoms of oxygen.

8. The method which comprises polymerizing in aqueous emulsion a butadiene-1,3 hydrocarbon in the presence of from 0.01 to 1% by weight based on the material polymerized of a water-soluble complex compound containing a central heavy metal atom, derived from a heavy metal element occurring in group VIII and the first long period of the periodic table, said central heavy metal atom having a primary positive valence of three and a coordination number of six and being connected by all six of its coordinating valences to nitrito groups.

9. The method which comprises polymerizing in an alkaline aqueous emulsion a mixture of butadiene-1,3 and another unsaturated compound which contains a single olefinic double bond and is copolymerizable therewith in aqueous emulsion, in the presence of from 0.01 to 1% by weight based on the material polymerized, of an alkali metal cobaltinitrite.

10. The method which comprises polymerizing in aqueous emulsion a mixture of butadiene-1,3 and acrylonitrile in the presence of from 0.01 to 1% by weight based on the material polymerized, of sodium cobaltinitrite.

11. The method which comprises polymerizing in aqueous emulsion a butadiene-1,3 hydrocarbon in the presence of from 0.01 to 1% by weight based on the material polymerized of a water-soluble complex compound containing a central heavy-metal atom, derived from a heavy metal element occurring in group VIII and the first long period of the periodic table, said central heavy-metal atom having a primary positive valence of three and a coordination number of six and being connected by one of its coordinating valences to a coordinating group composed of one atom of nitrogen and from one to two atoms of oxygen, and by the other of its coordinating valences to cyanide radicals.

12. The method which comprises polymerizing in aqueous emulsion a mixture of butadiene-1,3 and another unsaturated compound which contains a single olefinic double bond and is copolymerizable therewith in aqueous emulsion, in the presence of from 0.01 to 1% by weight based on the material polymerized, of a water-soluble complex compound containing a ferric iron atom connected by a coordinating valence to a coordinating group composed of one atom of nitrogen and from one to two atoms of oxygen, and connected by its remaining coordinated valences to cyanide radicals.

13. The method which comprises polymerizing in an alkaline aqueous emulsion a mixture of butadiene-1,3 and another unsaturated compound which contains a single olefinic double bond and is copolymerizable therewith in aqueous emulsion, in the presence of a per-oxygen compound and from 0.01 to 1% by weight based on the material polymerized, of an alkali metal nitroprusside.

14. The method which comprises polymerizing in aqueous emulsion a mixture of butadiene-1,3 and acrylonitrile in the presence of from 0.01 to 1% by weight based on the material polymerized of sodium nitroprusside.

15. The method which comprises polymerizing in aqueous emulsion a mixture of butadiene-1,3 and styrene in the presence of from 0.01 to 1% by weight based on the material polymerized of a water-soluble complex salt composed of an alkali-metal cation and a complex anion containing a ferric iron atom connected by a coordinating valence to a coordinating group composed of one atom of nitrogen and from one to two atoms of oxygen, and connected by its remaining coordinating valences to cyanide radicals.

16. The method which comprises polymerizing in aqueous emulsion a mixture of butadiene-1,3 and styrene in the presence of from 0.01 to 1% by weight based on the material polymerized of sodium nitroprusside.

WILLIAM D. STEWART.